(12) United States Patent
Haseba et al.

(10) Patent No.: US 11,320,178 B2
(45) Date of Patent: May 3, 2022

(54) COOLING DEVICE AND DISPLAY DEVICE (71) Applicant: SHARP KABUSHIKI KAISHA, Osaka (JP)

(72) Inventors: Yasuhiro Haseba, Osaka (JP); Kiyoshi Minoura, Osaka (JP)

(73) Assignee: SHARP KABUSHIKI KAISHA, Sakai (JP)

(*) Notice: Subject to any disclaimer, the term of this patent is extended or adjusted under 35 U.S.C. 154(b) by 89 days.

(21) Appl. No.: 16/831,662

(22) Filed: Mar. 26, 2020

(65) Prior Publication Data
US 2020/0309420 A1   Oct. 1, 2020

Related U.S. Application Data (60) Provisional application No. 62/826,773, filed on Mar. 29, 2019.

(51) Int. Cl.
*F25B 21/00* (2006.01)
*H01H 71/14* (2006.01)

(52) U.S. Cl.
CPC ............. *F25B 21/00* (2013.01); *H01H 71/14* (2013.01); *F25B 2321/001* (2013.01)

(58) Field of Classification Search
CPC ................ H05K 7/20954; F25B 21/00; F25B 2321/001; H01H 71/14; H01H 37/32; Y02B 30/00
USPC ............................................. 62/3.1
See application file for complete search history.

(56) References Cited

U.S. PATENT DOCUMENTS

| 8,695,353 B2 * | 4/2014 | Casasanta | F25B 21/00 62/3.1 |
| 2013/0104568 A1 * | 5/2013 | Kuo | F25B 21/00 62/3.1 |

OTHER PUBLICATIONS

Ma et al.: "Highly efficient electrocaloric cooling with electrostatic actuation", Science 357, 1130-1134 (Sep. 15, 2017).

* cited by examiner

*Primary Examiner* — Ana M Vazquez
(74) *Attorney, Agent, or Firm* — ScienBiziP, P.C.

(57) ABSTRACT

The cooling device includes an electrocaloric portion including an electrocaloric effect material, a first thermal switch including a first actuator, and a second thermal switch including a second actuator, in which a thickness and a length of the first actuator and the second actuator are changed depending on an electric field to be applied.

26 Claims, 6 Drawing Sheets

| | FORM | TEMPERATURE T (°C) | ΔT (°C) | ELECTRIC FIELD ΔE (MV/m) | ΔT/ΔE ($10^{-6}$ mK/V) | EVALUATION METHOD |
|---|---|---|---|---|---|---|
| PMN-PT 72/28 | SINGLE CRYSTAL | 130 | 2.7 | 1.2 | 2.25 | INDIRECT |
| PMN-PT 90/10 | CERAMICS | 28 | 1.25 | 1.5 | 0.83 | DIRECT |
| Pb(Nb,Zr,Sn,Ti)O$_3$ | CERAMICS | 170 | 2.6 | 3 | 0.87 | DIRECT |
| Co, Sb ADDITIVE Pb(Sc,Ta)O$_3$ | CERAMICS | 18 | 2.3 | N/A | N/A | ADIABATIC CALORIMETER |
| Ba$_{0.73}$Sr$_{0.27}$TiO$_3$ | CERAMICS | 25 | 1.00 | 2.4 | 0.42 | DSC |
| BaTiO$_3$ GROUP Y5V CAPACITOR | THICK FILM MULTILAYER | 70 | 0.5 | 30 | 0.02 | DIRECT |
| PMN-PT 70/30 | THICK FILM SINGLE LAYER | 160 | 2.8 | 9 | 0.31 | DIRECT |
| Co, Sb ADDITIVE Pb(Sc,Ta)O$_3$ | THICK FILM MULTILAYER | 18 | 3.5 | 13.5 | 0.26 | ADIABATIC CALORIMETER |
| PbZr$_{0.95}$Ti$_{0.05}$O$_3$ | THIN FILM | 222 | 12 | 48 | 0.25 | INDIRECT |
| PMN-PT 90/10 | THIN FILM | 60 | 5 | 96 | 0.06 | INDIRECT |
| (Pb,La)(Zr,Ti)O$_3$ | THIN FILM | 45 | 40 | 125 | 0.32 | DIRECT |
| SrBi$_2$Ta$_2$O$_9$ | THIN FILM | 288 | 4.93 | 60 | 0.08 | INDIRECT |
| P(VDF-TrFE)55/45 | POLYMER FILM | 80 | 12.6 | 209 | 0.06 | INDIRECT |
| P(VDF-TrFE)55/45 | POLYMER FILM | 67 | 12 | 120 | 0.10 | DIRECT |

FIG. 6B ial, an upper electrode and a lower electrode for applying an electric field (voltage) to the electrocaloric effect material, and a circuit for controlling the upper electrode and the lower electrode. The upper electrode is provided on a surface of the heat sink (Heat sink) 111 facing the heat source (Heat source) 110, and the lower electrode is provided on a surface of the heat source (Heat source) 110 facing the heat sink (Heat sink) 111.

COOLING DEVICE AND DISPLAY DEVICE

CROSS-REFERENCE TO RELATED APPLICATION

The present application claims priority from Provisional Application 62/826,773, the content to which is hereby incorporated by reference into this application.

TECHNICAL FIELD

The present disclosure relates to a cooling device and a display device.

BACKGROUND ART

In Ma et al. "Highly efficient electrocaloric cooling with electrostatic actuation", Science 357, 1130-1134 (15 Sep. 2017)(NPL 1), there is disclosed a cooling device in which an electrocaloric effect material, which controls an electric dipole moment of a substance by an electric field, and has an electrocaloric effect of generating or absorbing heat by a change in an entropy, functions as an actuator.

Figure 6A:
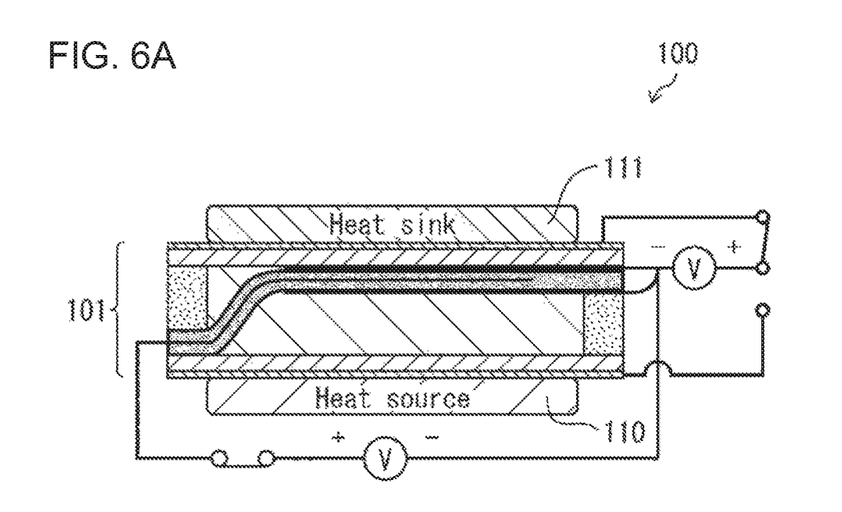
FIGS. 6A and 6B are diagrams for explaining a schematic configuration of a conventional cooling device.
Figure 6B:
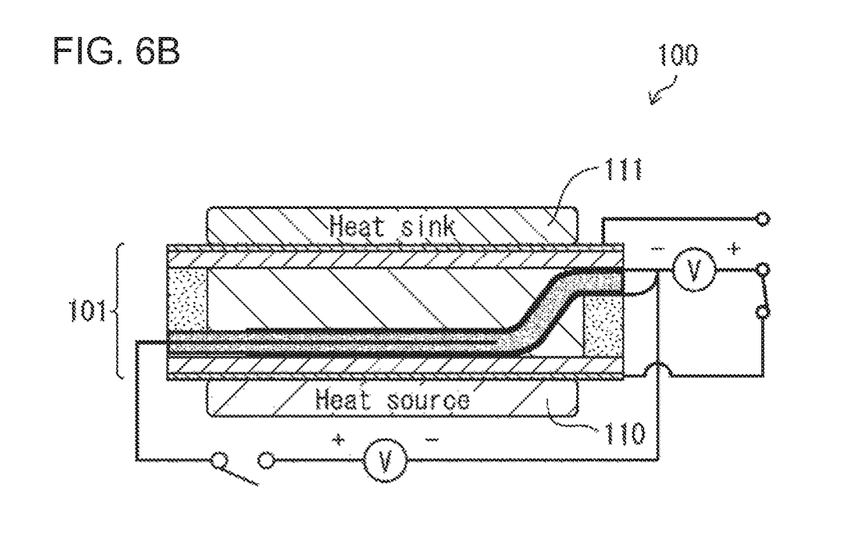

FIG. 6 and FIG. 6B are diagrams for explaining a schematic configuration of a conventional cooling device 100 described in NPL 1 below.

As illustrated in FIGS. 6A and 6B, the cooling device 100 includes a heat source (Heat source) 110, a heat sink (Heat sink) 111, and an electrocaloric element 101. The electrocaloric element 101 includes an electrocaloric effect material, an upper electrode and a lower electrode for applying an electric field (voltage) to the electrocaloric effect material, and a circuit for controlling the upper electrode and the lower electrode. The upper electrode is provided on a surface of the heat sink (Heat sink) 111 facing the heat source (Heat source) 110, and the lower electrode is provided on a surface of the heat source (Heat source) 110 facing the heat sink (Heat sink) 111.

As illustrated in FIG. 6A, in the electrocaloric element 101, when the electrocaloric effect material functioning as an actuator is in contact with the heat sink (Heat sink) 111 side, if an electric field is applied to the electrocaloric effect material through the upper electrode and the lower electrode, the electrocaloric effect material generates heat, and the heat moves to the heat sink (Heat sink) 111.

On the other hand, as illustrated in FIG. 6B, in the electrocaloric element 101, when the electrocaloric effect material functioning as an actuator is in contact with the heat source (Heat source) 110 side, if the electric field applied to the electrocaloric effect material is removed, the electrocaloric effect material absorbs heat and the heat is transferred from the heat source (Heat source) 110 to the electrocaloric effect material.

The cooling device 100 can cool the heat source (Heat source) 110 by repeating an operation illustrated in FIG. 6A and an operation illustrated in FIG. 6B.

SUMMARY OF INVENTION

Technical Problem

However, in a case of the cooling device 100 disclosed in NPL 1, as illustrated in FIG. 6A and FIG. 6B, in order to cool the heat source (Heat source) 110, in the electrocaloric element 101, it is necessary to repeatedly bend the electrocaloric effect material functioning as an actuator, and thus, there is a considerable problem in durability of the electrocaloric effect material functioning as an actuator.

Further, in the case of the cooling device 100 disclosed in NPL 1, in order for the electrocaloric effect material to function as an actuator, there is a limitation that a volume of the electrocaloric effect material is not possible to be increased beyond a certain volume or a shape thereof is not possible to be freely adjusted. As such, in the case of the cooling device 100, from the viewpoint of the limitation that the volume of the electrocaloric effect material is not possible to be larger than a certain volume, the number of times of repeatedly bending the electrocaloric effect material functioning as an actuator is not possible to be reduced, and the durability is difficult to be secured. In addition, the limitation of the volume leads to a limitation of the cooling efficiency from the viewpoint of heat capacity.

The present disclosure has been made in view of the above problems, and an object thereof is to provide a cooling device that can freely design a volume and a shape of an electrocaloric effect material, and has high durability, and a display device whose characteristics are hardly deteriorated even in a high temperature environment, or a display device having excellent characteristics.

Solution to Problem (1) According to an embodiment of the present invention, there is provided a cooling device including a heat source; a heat sink; and an actuator provided between the heat source and the heat sink, in which the actuator includes a first actuator and a second actuator of each of which a thickness and a length vary depending on an applied electric field, the cooling device further includes, between the heat source and the heat sink, an electrocaloric portion that includes an electrocaloric effect material having exothermic characteristics in an ON state where an electric field is applied, and endothermic characteristics in an OFF state where an electric field is not applied, and a plurality of first electrodes for applying an electric field to the electrocaloric effect material, a first thermal switch that includes a first low thermal conductive medium, a first actuator having a higher thermal conductivity than that of the first low thermal conductive medium, and a plurality of second electrodes for applying an electric field to the first actuator, and in which a heat transfer amount from the heat source to the electrocaloric effect material in a first state is larger than a heat transfer amount from the heat source to the electrocaloric effect material in a second state, and a second thermal switch that includes a second low thermal conductive medium, a second actuator having a higher thermal conductivity than that of the second low thermal conductive medium, and a plurality of third electrodes for applying an electric field to the second actuator, and in which a heat transfer amount from the electrocaloric effect material to the heat sink in a third state is larger than a heat transfer amount from the electrocaloric effect material to the heat sink in a fourth state, in a first period, the electrocaloric portion is in an OFF state, the first thermal switch is in the first state, and the second thermal switch is in the fourth state, and in a second period, the electrocaloric portion is in an ON state, the first thermal switch is in the second state, and the second thermal switch is in the third state.

(2) Further, in addition to a configuration of the above (1), according to the embodiment of the present invention, in the cooling device, the first thermal switch, the electrocaloric portion, and the second thermal switch are provided between the heat source and the heat sink in this order from the heat source side.

(3) Further, in addition to a configuration of the above (2), according to the embodiment of the present invention, in the cooling device, the plurality of second electrodes are provided on, a surface of the heat source facing the electrocaloric portion.

(4) Further, in addition to a configuration of the above (2), according to the embodiment of the present invention, in the cooling device, a first high thermal conductive layer having a higher thermal conductivity than that of the first low thermal conductive medium and the second low thermal conductive medium is provided on a surface of the heat source facing the electrocaloric portion, and the plurality of second electrodes are provided on a surface of the first high thermal conductive layer facing the electrocaloric portion.

(5) Further, in addition to any one of configurations of the above (2) to (4), according to the embodiment of the present invention, in the cooling device, the plurality of third electrodes are provided on a surface of the heat sink facing the electrocaloric portion.

(6) Further, in addition to any one of configurations of the above (2) to (4), according to the embodiment of the present invention, in the cooling device, a second high thermal conductive layer having a higher thermal conductivity than that of the first low thermal conductive medium and the second low thermal conductive medium is provided on a surface of the heat sink facing the electrocaloric portion, and the plurality of third electrodes are provided on a surface of the second high thermal conductive layer facing the electrocaloric portion.

(7) Further, in addition to any one of configurations of the above (2) to (6), according to the embodiment of the present invention, in the cooling device, the plurality of first electrodes are configured to include an upper electrode and a lower electrode, the upper electrode is provided on a surface of the electrocaloric effect material facing the heat source, and the lower electrode is provided on a surface of the electrocaloric effect material facing the heat sink.

(8) Further, in addition to a configuration of the above (1), according to the embodiment of the present invention, in the cooling device, the first thermal switch, the electrocaloric portion, and the second thermal switch are provided between the heat source and the heat sink in this order in a direction parallel to a surface of the heat source facing the heat sink.

(9) Further, in addition to a configuration of the above (8), according to the embodiment of the present invention, in the cooling device, the plurality of first electrodes are configured to include an upper electrode and a lower electrode, the upper electrode is provided on a surface of the electrocaloric effect material facing the heat source, the lower electrode is provided on a surface of the electrocaloric effect material facing the heat sink, a first low thermal conductive layer having a thermal conductivity equal to or lower than that of the first actuator and the second actuator is provided between a surface of the upper electrode facing the heat source and the heat source, and a second low thermal conductive layer having a thermal conductivity equal to or lower than that of the first actuator and the second actuator is provided between a surface of the lower electrode facing the heat sink and the heat sink.

(10) Further, in addition to the configuration of the above (8) or (9), according to the embodiment of the present invention, in the cooling device, the plurality of second electrodes are provided on a surface of the heat source facing the heat sink.

(11) Further, in addition to the configuration of the above (8) or (9), according to the embodiment of the present invention, in the cooling device, a third high thermal conductive layer having a higher thermal conductivity than that of the first low thermal conductive medium and the second low thermal conductive medium is provided on a surface of the heat source facing the heat sink, and the plurality of second electrodes are provided on a surface of the third high thermal conductive layer facing the heat sink.

(12) Further, in addition to any one of configurations of the above (8) to (11), according to the embodiment of the present invention, in the cooling device, the plurality of third electrodes are provided on a surface of the heat sink facing the heat source.

(13) Further, in addition to any one of the configurations of the above (8) to (11), according to the embodiment of the present invention, in the cooling device, a fourth high thermal conductive layer having a higher thermal conductivity than that of the first low thermal conductive medium and the second low thermal conductive medium is provided on a surface of the heat sink facing the heat source, and the plurality of third electrodes are provided on a surface of the fourth high thermal conductive layer facing the heat source.

(14) Further, in addition to the configuration of the above (8) or (9), according to the embodiment of the present invention, in the cooling device, the plurality of second electrodes are configured to include a second upper electrode and a second lower electrode, the second upper electrode is provided on a surface of the heat source facing the heat sink, and the second lower electrode is provided on a surface of the heat sink facing the heat source.

(15) Further, in addition to the configuration of the above (8) or (9), according to the embodiment of the present invention, in the cooling device, the plurality of second electrodes are configured to include a second upper electrode and a second lower electrode, a fifth high thermal conductive layer having a higher thermal conductivity than that of the first low thermal conductive medium and the second low thermal conductive medium is provided on a surface of the heat source facing the heat sink, and a sixth high thermal conductive layer having a higher thermal conductivity than that of the first low thermal conductive medium and the second low thermal conductive medium is provided on a surface of the heat sink facing the heat source, the second upper electrode is provided on a surface of the fifth high thermal conductive layer facing the heat sink, and the second lower electrode is provided on a surface of the sixth high thermal conductive layer facing the heat source.

(16) Further, in addition to any one of the configurations of the above (8), (9), (10), (11), (14), and (15) according to the embodiment of the present invention, in the cooling device, the plurality of third electrodes are configured to include a third upper electrode and a third lower electrode, the third upper electrode is provided on a surface of the heat source facing the heat sink, and the third lower electrode is provided on a surface of the heat sink facing the heat source.

(17) Further, in addition to any one of the configurations of the above (8), (9), (10), (11), (14), and (15) according to the embodiment of the present invention, in the cooling device, the plurality of third electrodes are configured to include a third upper electrode and a third lower electrode, a third low thermal conductive layer having a thermal conductivity equal to or lower than that of the first actuator and the second actuator is provided an a surface of the heat source facing the heat sink, a seventh high thermal conductive layer having a higher thermal conductivity than that of the first low thermal conductive medium and the second low thermal conductive medium is provided on a surface of the heat sink facing the heat source, the third upper electrode is provided on a surface of the third low thermal conductive layer facing the heat sink, and the third lower electrode is provided on a surface of the seventh high thermal conductive layer facing the heat source.

(18) Further, in addition to any one of the configurations of the above (8) to (13) according to the embodiment of the present invention, in the cooling device, an eighth high thermal conductive layer having a higher thermal conductivity than that of the first low thermal conductive medium and the second low thermal conductive medium is provided between the first thermal switch and the heat sink.

(19) Further, in addition to any one of the configurations of the above (8) to (13) according to the embodiment of the present invention, in the cooling device, a fourth low thermal conductive layer having a thermal conductivity equal to or lower than that of the first actuator and the second actuator is provided between the second thermal switch and the heat source.

(20) Further, in addition to any one of the configurations of the above (8) to (19) according to the embodiment of the present invention, in the cooling device, a ninth high thermal conductive layer having a higher thermal conductivity than that of the first low thermal conductive medium and the second low thermal conductive medium is provided between the first actuator in the first thermal switch and the electrocaloric effect material in the electrocaloric portion.

(21) Further, in addition to any one of the configurations of the above (8) to (20) according to the embodiment of the present invention, in the cooling device, a tenth high thermal conductive layer having a higher thermal conductivity than that of the first low thermal conductive medium and the second low thermal conductive medium is provided between the second actuator in the second thermal switch and the electrocaloric effect material in the electrocaloric portion.

(22) Further, in addition to any one of the configurations of the above (1) to (21) according to the embodiment of the present invention, in the cooling device, the first actuator and the second actuator are formed of a composite material containing a polymer material and a liquid crystal material.

(23) Further, in addition to any one of the configurations of the above (1) to (22) according to the embodiment of the present invention, in the cooling device, the electrocaloric effect material contains a liquid crystal material or a composite material containing a polymer material, and a liquid crystal material.

(24) Further, in addition to any one of the configurations of the above (1) to (23) according to the embodiment of the present invention, in the cooling device, the electrocaloric effect material is a composite material containing a thermal conductive filler.

(25) Further, in addition to any one of the configurations of the above (1) to (24) according to the embodiment of the present invention, in the cooling device, the first period and the second period are alternately repeated.

(26) Further, according to another embodiment of the present invention, there is provided a display device including the cooling device in any one of the configurations of the above (1) to (25); and a display panel.

It is possible to realize a cooling device that can freely design a volume and a shape of an electrocaloric effect material, and has high durability, and a display device whose characteristics are hardly deteriorated even in a high temperature environment, or a display device having excellent characteristics.

DESCRIPTION OF EMBODIMENTS

Embodiments of the present disclosure will be described below with reference to FIGS. 1A to 5B. Hereinafter, for convenience of explanation, the same reference numerals are given to components having the same functions as those described in the specific embodiment, and the description thereof may be omitted.

First Embodiment

Hereinafter, a cooling device 1 of a first embodiment will be described with reference to FIGS. 1A, 1B, 2A, and 2B.

Figure 1A:
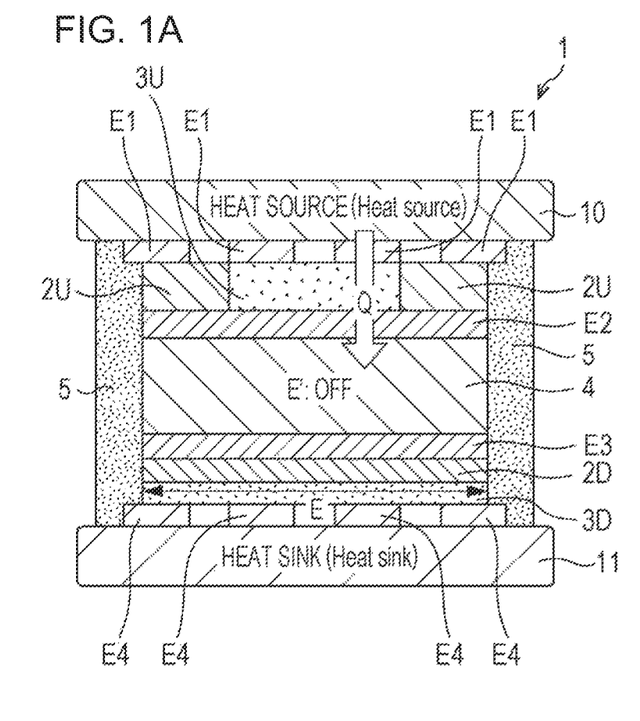
FIG. 1A is a diagram illustrating a case where a cooling device of a first embodiment is in a first period.
Figure 1B:
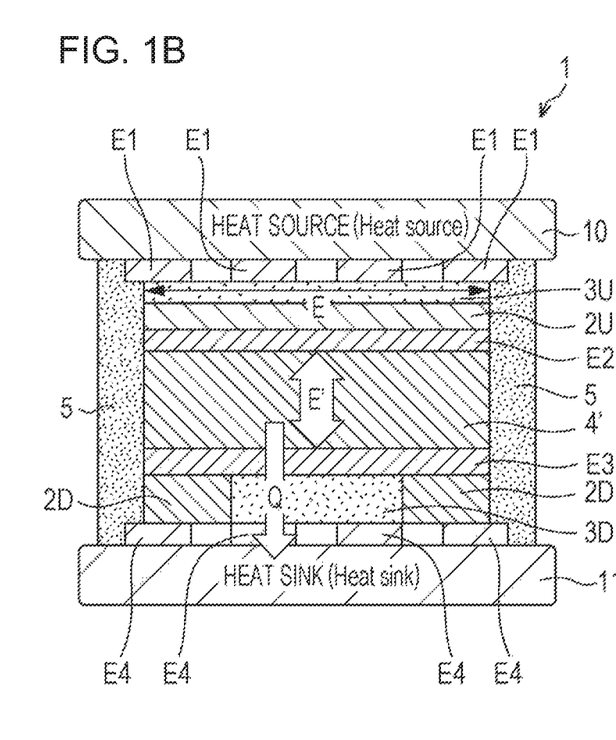
FIG. 1B is a diagram illustrating a case where the cooling device of the first embodiment is in a second period.

FIG. 1A is a diagram illustrating a case where the cooling device 1 of the first embodiment is in a first period, and FIG. 1B is a diagram illustrating a case where the cooling device 1 of the first embodiment is in a second period.

As illustrated in FIG. 1A and FIG. 1B, the cooling device 1 includes a heat source (Heat source) 10, a heat sink (Heat sink) 11, and a first actuator 3U and a second actuator 3D in which a thickness (width in a vertical direction in the drawing) and a length (width in a horizontal direction in the drawing and/or a direction perpendicular to a paper surface) change depending on an electric field E (voltage) to be applied. Specifically, between the heat source 10 and the heat sink 11 in the cooling device 1, an electrocaloric portion to be described later, and a first thermal switch, to be described later, including the first actuator 3U, a second thermal switch, to be described later, including the second actuator 3D are provided.

In the present embodiment, an example of a case where between the heat source 10 and the heat sink 11 in the cooling device 1, the first thermal switch, the electrocaloric portion, and the second thermal switch are provided in this order from the heat source 10 side has been described; however, the example is not limited to this case, the first thermal switch, the electrocaloric portion, and the second thermal switch may be arranged, for example, as in a second embodiment and a third embodiment to be described later.

In the present embodiment, as the first actuator 3U and the second actuator 3D, an example of a case of using a material of which the length in a voltage application direction is increased and the thickness is decreased when a voltage is applied has been described; however, the example is not limited to this case, and the first actuator 3U and the second actuator 3D may be made of a material of which the length in a voltage application direction is decreased and the thickness is increased when a voltage is applied.

The electrocaloric portion includes an electrocaloric effect material 4 having exothermic characteristics in an ON state where an electric field E' (voltage) is applied, and endothermic characteristics in an OFF state where the electric field (electric field E': OFF) is not applied, and a plurality of first electrodes E2 and E3 for applying an electric field to the electrocaloric effect material 4. In FIG. 1B, a case where the electrocaloric effect material 4 has the exothermic characteristics is referred to as an electrocaloric effect material 4'.

The first thermal switch includes a first low thermal conductive medium 2U, a first actuator 3U having a higher thermal conductivity than that of the first low thermal conductive medium 2U, and a plurality of second electrodes E1 for applying the electric field B to the first actuator 3U, and in which a heat transfer amount Q from the heat source 10 to the electrocaloric effect material 4 or 4' in a first state is larger than a heat transfer amount Q from the heat source 10 to the electrocaloric effect material 4 or 4' in a second state.

The second thermal switch includes a second low thermal conductive medium 2D, a second actuator 3D having a higher thermal conductivity than that of the second low thermal conductive medium 2D, and a plurality of third electrodes E4 for applying the electric field E to the second actuator 3D, and in which a heat transfer amount Q from the electrocaloric effect material 4 or 4' to the heat sink 11 in a third state is larger than a heat transfer amount from the electrocaloric effect material 4 or 4' to the heat sink 11 in a fourth state.

As illustrated in FIG. 1A, during the first period, in the cooling device 1, the electric field E' is not applied to the electrocaloric effect material 4 (electric field E': OFF) so that the electrocaloric portion is turned OFF, the first thermal switch is in the first state, and the second thermal switch is in the fourth state. On The other hand, as illustrated in FIG. 1B, during the second period, in the cooling device 1, the electric field E' is applied to the electrocaloric effect material 4' so that the electrocaloric portion is turned ON, the first thermal switch is in the second state, and the second thermal switch is in the third state.

In the first thermal switch and the second thermal switch of the present embodiment, as the first actuator 3U and the second actuator 3D, a material of which the length in a voltage application direction is increased and the thickness is decreased when a voltage is applied is used, and in a case where the lengths of the first actuator 3U and the second actuator 3D in the voltage application direction are increased and the thicknesses thereof are decreased, the heat transfer amount Q is decreased.

In the present embodiment, the first state of the first thermal switch means an OFF state of the first thermal switch when the electric field E is not applied to the first actuator 3U, and the second state of the first thermal switch means an ON state of the first thermal switch when the electric field E is applied to the first actuator 3U. The heat transfer amount Q from the heat source 10 to the electrocaloric effect material 4 or 4' in the OFF state of the first thermal switch is larger than the heat transfer amount Q from the heat source 10 to the electrocaloric effect material 4 or 4' in the ON state of the first thermal switch. In addition, the third state of the second thermal switch means an OFF state of the second thermal, switch when the electric field E is not applied to the second actuator 3D, and the fourth state of the second thermal switch means an ON state of the second thermal switch when the electric field E is applied to the second actuator 3D. The heat transfer amount Q from the electrocaloric effect material 4 or 4' to the heat sink 11 in the OFF state of the first thermal switch is larger than the heat transfer amount Q from the electrocaloric effect material 4 or 4' to the heat sink 11 in the ON state of the second thermal switch.

In the cooling device 1, the heat of the heat source 10 can be cooled by alternately repeating the first period and the second period.

In the first period of the cooling device 1, by a circuit (not shown), the electric field E' is not applied (electric field E': OFF) to the electrocaloric effect material 4, the electrocaloric portion is turned OFF, and at this timing, the electric field E is not applied to the first actuator 3U in the first thermal switch, the first thermal switch is turned OFF, the electric field E is applied to the second actuator 3D in the second thermal switch, and the second thermal switch is turned ON.

As illustrated in FIG. 1A, during the period when the first thermal switch is turned OFF, the electric field E is removed from the first actuator 3U, the first actuator 3U is changed such that the thickness (width in the vertical direction in the drawing) is increased, and the length (width in the horizontal direction in the drawing and/or the direction perpendicular to a paper surface) is decreased, that is, is expanded and contracted. By changing the first actuator 3U in this way, in the first actuator 3U having a higher thermal conductivity than that of the first low thermal conductive medium 2U, a contact area with the plurality of second electrodes E1 provided on the heat source 10 is decreased, but a contact area with the first electrode (upper electrode) E2 provided on the electrocaloric effect material 4 can be increased. Then, in the cooling device 1, a portion where the length (width in the horizontal direction in the drawing) of the first actuator 3U is reduced is filled with the first low thermal conductive medium 2U. On the other hand, at this time, the electric field E is applied to the second actuator 3D via the plurality of third electrodes E4, and the second actuator 3D has a reduced thickness (width in the vertical direction in the drawing) and an increased length (width in the horizontal direction in the drawing and/or the direction perpendicular to a paper surface). When the second actuator 3D is changed in this way and maintained in the state when the electric field E is applied, the second actuator 3D has a large contact area with the plurality of third electrodes E4 provided on the heat sink 11, but the second low thermal conductive medium 2D is extended between the second actuator 3D and the first electrode (lower electrode) E3 provided on the electrocaloric effect material 4, and thus the second actuator 3D and the first electrode (lower electrode) Es provided on the electrocaloric effect material 4 are not directly in contact with each other. In the present embodiment, although a case where the second actuator 3D and the first electrode (lower electrode) E3 provided on the electrocaloric effect material 4 are not directly in contact with each other has been described as an example, if the heat transfer amount Q from the electrocaloric effect material 4 or 4' to the heat sink 11 in the OFF state of the second thermal switch is larger than the heat transfer amount Q from the electrocaloric effect material 4 or 4' to the heat sink 11 in the ON state of the second thermal switch, the second actuator 3D and the first electrode (lower electrode) E3 provided on the electrocaloric effect material 4 may be partially directly in contact with each other.

As described above, during the first period of the cooling device 1, the electrocaloric effect material 4 has endothermic characteristics, and the heat transfer amount Q from the heat source 10 to the electrocaloric effect material 4 can be increased, and therefore the heat of the heat source 10 can be transferred to the electrocaloric effect material 4 and stored therein.

As illustrated in FIG. 1B, during the period when the second thermal switch is turned OFF, the electric field E is removed from the second actuator 3D, the second actuator 3D is changed such that the thickness (width in the vertical direction in the drawing) is increased, and the length (width in the horizontal direction in the drawing and/or the direction perpendicular to a paper surface) is decreased, that is, is expanded and contracted. By changing the second actuator 3D in this way, in the second actuator 3D having a higher thermal conductivity than that of the second low thermal conductive medium 2D, a contact area with the plurality of third electrodes E4 provided on the heat sink 11 is decreased, but a contact area with the first electrode (lower electrode) E3 provided on the electrocaloric effect material 4' can be increased. Then, in the cooling device 1, a portion where the length (width in the horizontal direction in the drawing) of the second actuator 3D is reduced is filled with the second low thermal conductive medium 2D. On the other hand, at this time, the electric field E is applied to the first actuator 3U, and the first actuator 3U has a reduced thickness (width in the vertical direction in the drawing) and an increased length (width in the horizontal direction in the drawing and/or the direction perpendicular to a paper surface). When the first actuator 3U is changed in this way and maintained in the state when the electric field E is applied, the first actuator 3U has a large contact area with the plurality of second electrodes E1 provided on the heat source 10, but the first low thermal conductive medium 2U is extended between the first actuator 3U and the first electrode (upper electrode) E2 provided on the electrocaloric effect material 4', and thus the first actuator 3U and the first electrode (upper electrode) E2 provided on the electrocaloric effect material 4' are not directly in contact with each other. In the present embodiment, although a case where the first actuator 3U and the first electrode (upper electrode) E2 provided on the electrocaloric effect material 4' are not directly in contact with each other has been described as an example, if the heat transfer amount from the electrocaloric effect material 4 or 4' to the heat source 10 in the OFF state of the first thermal switch is larger than the heat transfer amount Q from the electrocaloric effect material 4 or 4' to the heat source 10 in the ON state of the first thermal switch, the first actuator 3U and the first electrode (upper electrode) E2 provided on the electrocaloric effect material 4' may be partially directly in contact with each other.

As described above, during the second period of the cooling device 1, the electrocaloric effect material 4' has exothermic characteristics, and the heat transfer amount Q from the electrocaloric effect material 4' to the heat sink 11 can be increased, and therefore, the heat stored in the electrocaloric effect material 4' can be transferred to the heat sink 11 during the first period.

In the cooling device 1, since the electrocaloric effect material 4 or 4' is not used as an actuator, the volume and shape of the electrocaloric effect material 4 or 4' can be freely designed. Further, the first actuator 3U and the second actuator 3D are changed so as to be expanded and contracted without being bent, and thereby the cooling device 1 with high durability can be realized.

As the electrocaloric effect material 4 or 4', for example, a material having a large temperature change due to polarization, a material having a small specific heat or density, and a material capable of applying a high electric field E are preferable (refer to (Equation 1) below); however, the material is not limited.

[Math. 1]

$$\Delta T = -\frac{1}{C\rho} \int_{E1}^{E2} T \left( \frac{\partial P}{\partial T} \right)_E dE \quad \text{(Equation 1)}$$

In (Equation 1), ΔT means temperature change due to an electrocaloric effect, C means non-heat, ρ means density, E means an electric field, T means temperature, and P means a degree of polarization.

Further, as the electrocaloric effect material 4 or 4', a relaxor ferroelectric such as Poly (also referred to as vinylidene fluoride-ter-trifluoroethylene-ter-chlorofluoroethylene (59.4/33.4/7.2 mol %) (p(VDF-TrFE-CFE)) or a composite of the relaxor ferroelectric and ceramics may be used (refer to Adv. Mater. 2015/27, 2236-2241).

In addition, as the electrocaloric effect material 4 or 4', a liquid crystal material or a composite material containing a polymer material and a liquid crystal material may be used, (Pennsylvania State University, Thesis (2015) (https://etda.libraries.psu.edu/files/final_submissions/1106 0) or US Provisional Application (Application No. 62/725,379)), and a composite material containing a thermal conductive filler, a polymer material, and a liquid crystal material (refer to US Provisional Application (Application No. 62/725, 379)) may be used. It is more preferable that the thermal conductive filler is insulative (refer to US Provisional Application (Application No. 62/725,379)).

Figure 2:
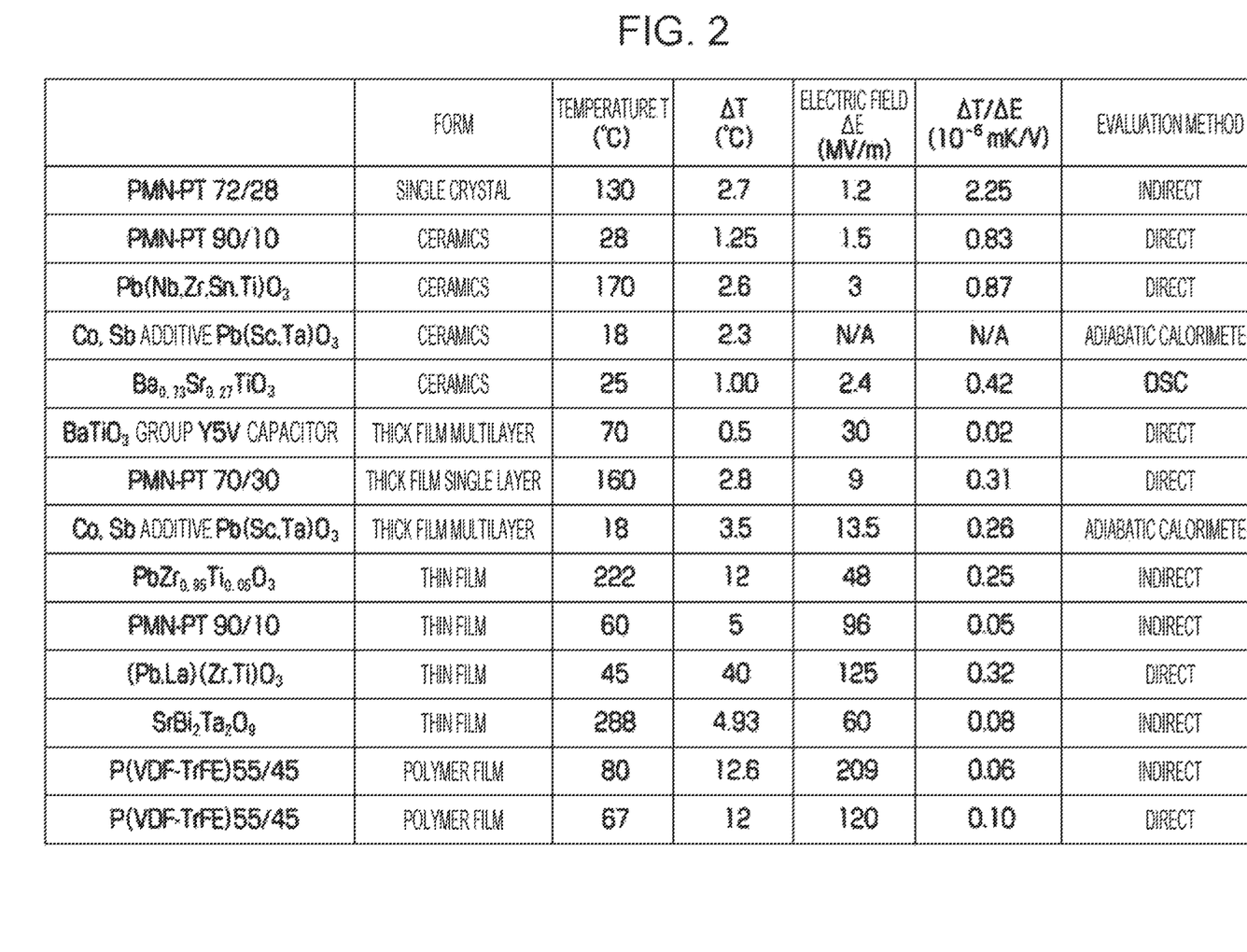
FIG. 2 is a diagram illustrating an example of an electrocaloric effect material provided in the cooling device of the first embodiment illustrated in FIG. 1A and FIG. 1B.

Further, as the electrocaloric effect material 4 or 4', for example, a material as illustrated in FIG. 2 below may be used.

FIG. 2 is a diagram illustrating an example of the electrocaloric effect material 4 or 4' provided in the cooling device of the first embodiment illustrated in FIG. 1A and FIG. 1B.

As illustrated in FIG. 2, PMN-PT in single crystal form (72/28 mol %), PMN-PT in a ceraxiic form (90/10 mol %), Pb (Nb, Zr, Sn, Ti)$O_3$ in the ceramic form, Pb (Sc, Ta)$O_3$ added with Co and Sb in the ceramic form, $Ba_{0.73}Sr_{0.27}TiO_3$ in the ceramic form, or a $BaTiO_3$-based Y5V capacitor in a thick film multilayer form, PMN-PT (70/30 mol %) in a thick film single layer form, Co and Sb-added Pb (Sc, Ta)$O_3$ in a thick film multilayer form, $PbZr_{0.95}Ti_{0.05}O_3$ in a thin film form, PMN-PT (90/10 mol %) in the thin film form, (Pb, La) (Zr, Ti)$O_3$ in the thin film form, $SrBi_2Ta_2O_9$ in the thin film form, P(VDF-TrFE) (55/45 mol %) in a polymer film form or the like may be used. Note that, PMN-PT in FIG. 2 means Pb(Mg, Nb) $O_3$-$PbTiO_3$, and P(VDF-TrFE) means a vinylidene fluoride/ethylene trifluoride copolymer, and DSC means for a differential scanning calorimeter.

As the plurality of second electrodes E1 for applying the electric field E to the first actuator 3U and the plurality of third electrodes E4 for applying the electric field E to the second actuator 3D, although a metal material or a conductive material can be used, a material that has a higher thermal conductivity than that of the first low thermal conductive medium 2U and the second low thermal conductive medium 2D and capable of applying a voltage is required. In the present embodiment, these are formed by ITO (Indium Tin Oxide), but the present invention is not limited to this.

Also, as the first electrode (upper electrode) E2 provided in the electrocaloric effect material 4 or 4' and the first electrode (lower electrode) E3 provided in the electrocaloric effect material 4 or 4', although a metal material or a conductive material can be used, a material that has a higher thermal conductivity than that of the first low thermal conductive medium 2U and the second low thermal conductive medium 2D is preferably and a material capable of applying a voltage is required. In the present embodiment, these are formed by ITO (Indium Tin Oxide), but the present invention is not limited to this.

The thermal conductivity of the first low thermal conductive medium 2U and the second low thermal conductive medium 2D is preferably 0.001 to 0.7 (W/(mK)) at 300 K, and is more preferably 0.01 to 0.2 (W/(mK)) at 300 K. The thermal conductivity of the first actuator 3U and the second actuator 3D is preferably 0.1 to 30 (W/(mK)) at 300 K, and is more preferably 0.2 to 20 (W/(mE)) at 300 K. Further, the thermal conductivity of each electrode is preferably 1 to 1000 (W/(mK)) at 300 K, is more preferably 5 to 500 (W/(mK)) at 300 K.

As the first actuator 3U and the second actuator 3D, for example, an electrostrictive polymer material (a polymer material that is strained in an electric field), a liquid crystal elastomer material, or the like can be used. In a case of using a liquid crystal elastomer material, for example, a polymer liquid crystal and a polymer liquid crystal swollen with a solvent, or a composite material containing a polymer material and a low molecular liquid crystal (liquid crystal material) can be used, and in order to drive at a low voltage, it is preferable to use such a composite material (refer to Physical Properties Research (2010), 93 (5): 579-590).

Further, as the first low thermal conductive medium 2U and the second low thermal conductive medium 2D, for example, a gas or a low thermal conductive liquid can be used, but the present invention is not limited thereto. In a case where the gas is used, air is preferable from tine viewpoint of cost. In addition, in a case where the low thermal conductive liquid is used, it is preferable to use a material that is non-volatile under use conditions and is not immersed into a contact member such as the first actuator 3U, the second actuator 3D, and a seal member 5 including a spacer. For example, silicone oil can be used.

As illustrated in FIG. 1A and FIG. 1B, in the present embodiment, the case where tine plurality of second electrodes E1 for applying the electric field E to the first actuator 3U are provided on a surface of the heat source 10 facing the electrocaloric portion has been described as an example; however, the present invention is not limited thereto, for example, first, a high thermal conductive layer (not shown) having a higher thermal conductivity than that of the first low thermal conductive medium 2U and the second low thermal conductive medium 2D is provided on a surface of the heat source 10 facing the electrocaloric portion, and thereafter, the plurality of second electrodes E1 for applying the electric field E to the first actuator 3U may be provided on a surface of the high thermal conductive layer (not shown) facing the electrocaloric portion.

As illustrated in FIG. 1A and FIG. 1B, in the present embodiment, the case where the plurality of third electrodes E4 for applying the electric field E to the second actuator 3D are provided on a surface of the heat sink 11 facing the electrocaloric portion has been described as an example; however, the present invention is not limited thereto, for example, first, a high thermal conductive layer (not shown) having a higher thermal conductivity than that of the first low thermal conductive medium 2U and the second low thermal conductive medium 2D is provided on a surface of the heat sink 11 facing the electrocaloric portion, and thereafter, the plurality of third electrodes E4 for applying the electric field E to the second actuator 3D may be provided on a surface of the high thermal conductive layer (not shown facing the electrocaloric portion.

Also, as illustrated in FIG. 1A and FIG. 1B, in the present embodiment, the case where the first electrode (upper electrode) E2 is provided on a surface of the electrocaloric effect material 4 or 4' facing the heat source 10, and the first electrode (lower electrode) E3 is provided on the surface of the electrocaloric effect material 4 or 4' facing the heat sink 11 has been described as an example; however, the present invention is not limited thereto.

Figure 3A:
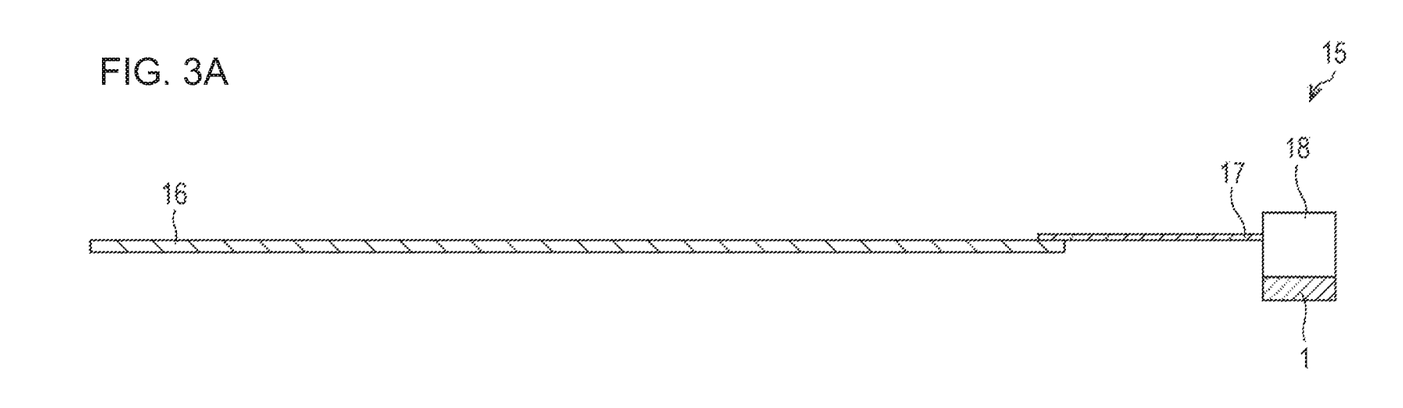
FIGS. 3A and 3B are diagrams illustrating a schematic configuration of a display device including the cooling device of the first embodiment illustrated in FIG. 1A and FIG. 1B.

FIG. 3A is diagram illustrating a schematic configuration of a display device 15 including the cooling device 1.

The display device 15 includes a display panel 16, a control circuit 18, a wiring 17 for electrically connecting a wiring of the display panel 16 and a terminal of the control circuit 18, and the cooling device 1. In this case, the control circuit 18 that generates heat is the heat source 10 of the cooling device 1, and a heat sink or the like can be used as the heat sink 11 of the cooling device 1. Note that a circuit (not shown) for controlling each electrode in the cooling device 1 may be included in the control circuit 18 or may be provided separately from the control circuit 18.

Figure 3B:
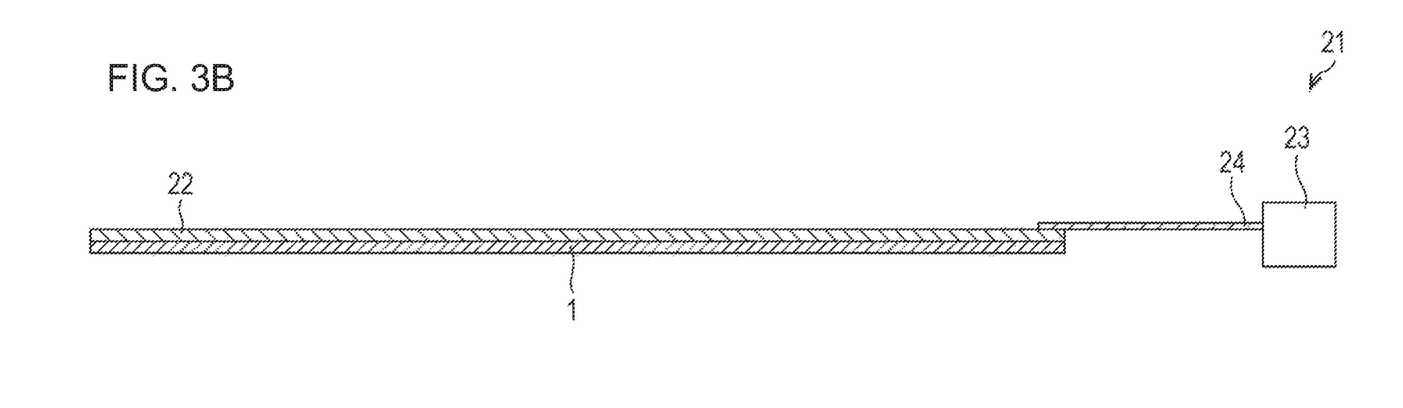

FIG. 3B is a diagram illustrating a schematic configuration of the display device 21 including the cooling device 1.

The display device 21 includes a display panel 22, a control circuit 23, a wiring 24 for electrically connecting a wiring of the display panel 22, a terminal of the control circuit 23, and the cooling device 1. In this case, the display panel 22 that generates heat is the heat source 10 of the cooling device 1, and a heat sink or the like can be used as the heat sink 11 of the cooling device 1. Note that, a circuit (not shown) for controlling each electrode in the cooling device 1 may be included in the control circuit 23 or may be provided separately from the control circuit 23.

In general, displays are prone to degradation in a high temperature environment. In the display device of the present embodiment, deterioration of the display device is suppressed because the display temperature does not easily rise even in a high temperature environment. In addition, the display member may have sacrificed optical characteristics and the like in order to enable use in a high temperature environment. Since the members used in the display device of the present embodiment are less likely to deteriorate in the high temperature environment, members for display can be selected in a wider range and members having high characteristics such as optical characteristics can be selected.

Second Embodiment

Next, a second embodiment of the present invention will be described with reference to FIG. 4A and FIG. 4B. The second embodiment is different from the first embodiment from the viewpoint that in a cooling device 20 of the present embodiment, between the heat source 10 and the heat sink 11, a first thermal switch, an electrocaloric portion, and a second thermal switch are provided in this order in a direction (horizontal direction in a drawing) parallel to a surface of the heat source 10 facing the heat sink 11. Other configurations are the same as those described in the first embodiment. For convenience of explanation, members having the same functions as those illustrated in the drawings of first embodiment are given the same reference numerals, and descriptions thereof will be omitted.

Figure 4A:
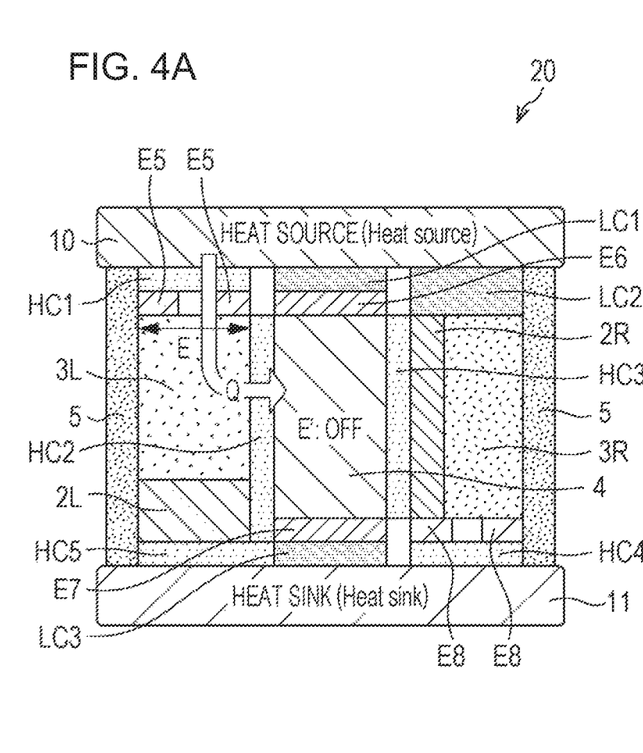
FIG. 4A is a diagram illustrating a case where a cooling device of a second embodiment is in a first period.
Figure 4B:
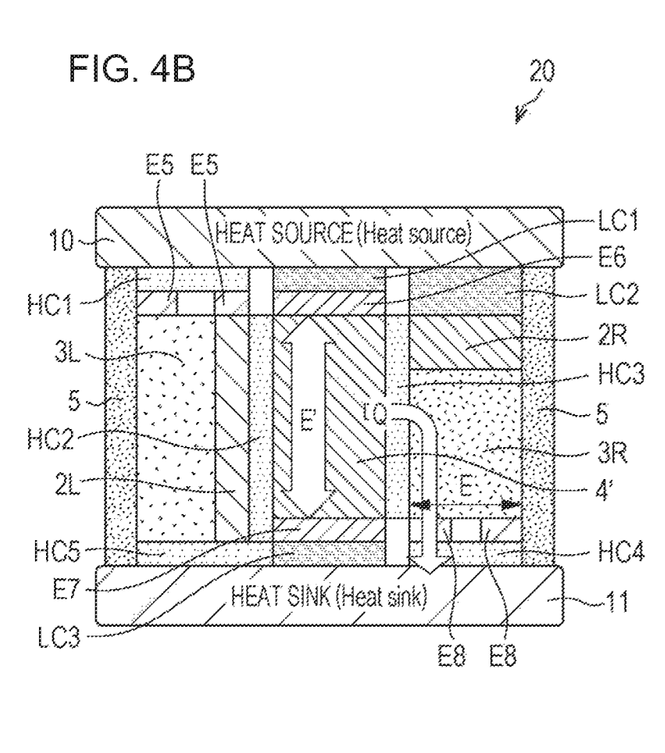
FIG. 4B is a diagram illustrating a case where the cooling device of the second embodiment is in a second period.

FIG. 4A is a diagram illustrating a case where the cooling device 20 of the second embodiment is in a first period, and FIG. 4B is a diagram illustrating a case where the cooling device 20 of the second embodiment is in a second period.

As illustrated in FIGS. 4A and 4B, in the cooling device 20, between the heat source 10 and the heat sink 11, a first thermal switch, an electrocaloric portion, and a second thermal switch are provided in this order in a direction (horizontal direction in a crawling) parallel to a surface of the heat source 10 facing the heat sink 11.

The electrocaloric portion includes an electrocaloric effect material 4 or 4' having exothermic characteristics in an ON state where an electric field E' (voltage) is applied, and endothermic characteristics in an OFF state where the electric field (electric field E': OFF) is not applied, and a plurality of first electrodes E6 and E7 for applying an electric field to the electrocaloric effect material 4 or 4'.

The first thermal switch includes a first low thermal conductive medium 2L, a first actuator 3L having a higher thermal conductivity than that of the first low thermal conductive medium 2L, and a plurality of second electrodes E5 for applying the electric field E to the first actuator 3L, and in which a heat transfer amount Q from the heat source 10 to the electrocaloric effect material 4 or 4' in a first state is larger than a heat transfer amount Q from the heat source 10 to the electrocaloric effect material 4 or 4' in a second state.

The second thermal switch includes a second low thermal conductive medium 2R, a second actuator 3R having a higher thermal conductivity than that of the second low thermal conductive medium 2R, and a plurality of third electrodes E8 for applying the electric field E to the second actuator 3R, and in which a heat transfer amount Q from the electrocaloric effect material 4 or 4' to the heat sink 11 in a third state is larger than a heat transfer amount Q from the electrocaloric effect material 4 or 4' to the heat sink 11 in a fourth state.

As illustrated in FIG. 4A, during the first period, in the cooling device 20, the electric field E' is not applied to the electrocaloric effect material 4 (electric field E': OFF) so that the electrocaloric portion is turned OFF, the first thermal switch is in the first state, and the second thermal switch is in the fourth state. On the other hand, as illustrated in FIG. 4B, during the second period, in the cooling device 20, the electric field E' is applied to the electrocaloric effect material 4' so that the electrocaloric portion is turned ON, the first thermal switch is in the second state, and the second thermal switch is in the third state.

In the first thermal switch and the second thermal switch of the present embodiment, as the first actuator 3L and the second actuator 3R, a material of which the length in a voltage application direction is increased and the thickness is decreased when a voltage is applied is used, and in a case where the lengths of the first actuator 3L and the second actuator 3R in the voltage application direction are increased and the thicknesses thereof are decreased, the heat transfer amount Q is increased.

In the present embodiment, the first state of the first thermal switch means an ON state of the first thermal switch when the electric field E is applied to the first actuator 3L, and the second state of the first thermal switch means an OFF state of the first thermal switch when the electric field E is not applied to the first actuator 3L. The heat transfer amount Q from the heat source 10 to the electrocaloric effect material 4 or 4' in the ON state of the first thermal switch is larger than the heat transfer amount Q from the heat source 10 to the electrocaloric effect material 4 or 4' in the OFF state of the first thermal switch. In addition, the third state of the second thermal switch means an ON state of the second thermal switch when the electric field E is applied to the second actuator 3R, and the fourth state of the second thermal switch means an OFF state of the second thermal switch when the electric field E is not applied to the second actuator 3R. The heat transfer amount Q from the electrocaloric effect material 4 or 4' to the neat sink 11 in the ON state of the first thermal switch is larger than the heat transfer amount Q from the electrocaloric effect material 4 or 4' to the heat sink 11 in the OFF state of the second thermal switch.

Also, as illustrated in FIG. 4A and FIG. 4B, in the cooling device 20, the case where the first electrode (upper electrode) E6 is provided on a surface of the electrocaloric effect material 4 or 4' facing the heat source 10, and the first electrode (lower electrode) E7 is provided on the surface of the electrocaloric effect material 4 or 4' facing the heat sink 11. In addition, it is preferable that a low thermal conductive layer LC1 whose thermal conductivity is equal to or less than that of the first actuator 3L and the second actuator 3R is provided between the surface of the first electrode (upper electrode) E6 facing the heat source 10 and the heat source 10, and it is preferable that a low thermal conductive layer LC3 having a thermal conductivity equal to or lower than that of the first actuator 3L and the second actuator 3R is provided between the surface of the first electrode (lower electrode) E7 facing the heat sink 11 and the heat sink 11.

In the present embodiment, a case where a high thermal conductive layer HC1 having a higher thermal conductivity than that of the first low thermal conductive medium 2L and the second low thermal conductive medium 2R is provided on a surface of the heat source 10 facing the heat sink 11, and the plurality of second electrodes E5 are provided on the surface of the high thermal conductive layer HC1 facing the heat sink 11 has been described as an example; however, the present invention is not limited thereto, and the plurality of second electrodes E5 may be provided on the surface of the heat source 10 facing the heat sink 11, as in the first embodiment.

In addition, in the present embodiment, a case where a high thermal conductive layer HC4 having a higher thermal conductivity than that of the first low thermal conductive medium 2L and the second low thermal conductive medium 2R is provided on a surface of the heat sink 11 facing the heat source 10, and the plurality of third electrodes E8 are provided on the surface of the high thermal conductive layer HC4 facing the heat source 10 has been described as an example; however, the present invention is not limited thereto, and the plurality of third electrodes E8 may be provided on the surface of the heat sink 11 facing the heat source 10, as in the first embodiment.

In the present embodiment, a high thermal conductive layer HC5 of which a thermal conductivity is equal to or higher than that of the first low thermal conductive medium 2L and the second low thermal conductive medium 2R may be provided between the first thermal switch and the heat sink 11.

In the present embodiment, a low thermal conductive layer LC2 of which a thermal conductivity is equal to or lower than that of the first actuator 3L and the second actuator 3R may be provided between the second thermal switch and the heat source 10.

Further, in the present embodiment, it is preferable that a high thermal conductive layer HC2 having a higher thermal conductivity than that of the first low thermal conductive medium 2L and the second low thermal conductive medium 2R is provided between the first actuator 3L in the first thermal switch and the electrocaloric effect material 4 or 4' in the electrocaloric portion, and it is preferable that a high thermal conductive layer HC3 having a higher thermal conductivity than that of the first low thermal conductive medium 2L and the second low thermal conductive medium 2R is provided between the second actuator 3R in the second thermal switch and the electrocaloric effect material 4 or 4' in the electrocaloric portion.

As illustrated in FIG. 4A, during the first period of the cooling device 20, the electrocaloric portion and the second thermal switch are turned OFF, and the first thermal switch is turned ON, and as illustrated in FIG. 4B, during the second period of the cooling device 20, the electrocaloric portion and the second thermal switch are turned ON, and the first thermal switch is turned OFF. In the cooling device 20, the heat of the heat source 10 can be cooled by alternately repeating the first period and the second period.

As illustrated in FIG. 4A, during the period when the first thermal switch is turned ON, the electric field E is applied through the plurality of second electrode E5 to the first actuator 3L, the first actuator 3L is changed such that the thickness (width in the vertical direction in the drawing) is decreased, and the length (width in the horizontal direction in the drawing and/or the direction perpendicular to a paper surface) is increased, that is, is expanded and contracted. By changing the first actuator 3L in this way, in the first actuator 3L having a higher thermal conductivity than that of the first low thermal conductive medium 2L, a contact area with a laminate of the high thermal conductive layer HC 1 and the plurality of second electrodes E5 provided on the heat source 10 can be increased. In addition, such a change in the first actuator 3L can increase the contact area with the high thermal conductive layer HC2. Then, in the cooling device 20, a portion where the thickness (width in the vertical direction in the drawing) of the first actuator 3L is reduced is filled with the first low thermal conductive medium 2L. On the other hand, at this time, the electric field E is not applied to the second actuator 3R via the plurality of third electrodes E8, and the second actuator 3R has an increased thickness (width in the vertical direction in the drawing) and a decreased length (width in the horizontal direction in the drawing and/or the direction perpendicular to a paper surface). As the second actuator 3R changes in this way, the second low thermal conductive medium 2R is extended between the second actuator 3R and the high thermal conductive layer HC3, and thus the second actuator 3R is not directly in contact with the high thermal conductive layer HC3. In the present embodiment, although a case where the second actuator 3R and the high thermal conductive layer HC3 are not directly in contact with each other has been described as an example, if the heat transfer amount Q from the electrocaloric effect material 4 or 4' to the heat sink 11 in the ON state of the second thermal switch is larger than the heat transfer amount Q from the electrocaloric effect material 4 or 4' to the heat sink 11 in the OFF state of the second thermal switch, the second actuator 3R and the high thermal conductive layer HC3 may be partially directly in contact with each other.

As described above, during the first period of the cooling device 20, the electrocaloric effect material 4 has endothermic characteristics, and the heat transfer amount Q from the heat source 10 to the electrocaloric effect material 4 can be increased, and therefore the heat of the heat source 10 can be transferred to the electrocaloric effect material 4 and stored therein.

As illustrated in FIG. 4B, during the period when the second thermal switch is turned ON, the electric field F is applied through the plurality of third electrode E8 to the second actuator 3R, the second actuator 3R is changed such that the thickness (width in the vertical direction in the drawing) is decreased, and the length (width in the horizontal direction in the drawing and/or the direction perpendicular to a paper surface) is increased, that is, is expanded and contracted. By changing the second actuator 3R in this way, the second actuator 3R having a higher thermal conductivity than that of the second low thermal conductive medium 2R can increase a contact area with the high thermal conductive layer HC3 and a contact area with the plurality of third electrodes E8 on the high thermal conductive layer HC4 provided on the heat sink 11. Then, in the cooling device 20, a portion where the thickness (width in the vertical direction in the drawing) of the second actuator 3R is reduced is filled with the second low thermal conductive medium 2R. On the other hand, at this time, the electric field E is not applied to the first actuator 31 via the plurality of second electrodes E5, and the first actuator 3L has an increased thickness (width in the vertical direction in the drawing) and a decreased length (width in the horizontal direction in the drawing and/or the direction perpendicular to a paper surface). As the first actuator 31 changes in this way, the first low thermal conductive medium 2L is extended between the first actuator 3L and the high thermal conductive layer HC2, and thus the first actuator 3L is not directly in contact with the high thermal conductive layer HC2. In the present embodiment, although a case where the first actuator 3L and the high thermal conductive layer HC2 are not directly in contact with each other has been described as an example, if the heat transfer amount Q from the heat source 10 to the electrocaloric effect material 4 or 4' in the ON state of the first thermal switch is larger than the heat transfer amount Q from the heat source 10 to the electrocaloric effect material 4 or 4' in the OFF state of the first thermal switch, the first actuator 3L and the high thermal conductive layer HC2 may be partially directly in contact with each other.

As described above, during the second period of the cooling device 20, the electrocaloric effect material 4' has exothermic characteristics, and the heat transfer amount Q from the electrocaloric effect material 4' to the heat sink 11 can be increased, and therefore, the heat stored in the electrocaloric effect material 4' can be transferred to the heat sink 11 during the first period.

In the cooling device 20, since the electrocaloric effect material 4 or 4' is not used as an actuator, the volume and shape of the electrocaloric effect material 4 or 4' can be freely designed. Further, the first actuator 3L and the second actuator 3R are changed so as to be expanded and contracted without being bent, and thereby the cooling device 20 with high durability can be realized.

The thermal conductivity of the first low thermal conductive medium 2L and the second low thermal conductive medium 2R is preferably 0.001 to 0.7 (W/(mK)) at 300 K, and is more preferably 0.01 to 0.2 (W/(mK)) at 300 K. The thermal conductivity of the first actuator 3L and the second actuator 3R is preferably 0.1 to 30 (W/(mK)) at 300 K, and is more preferably 0.2 to 20 (W/(mK)) at 300 K. In addition, the thermal conductivity of each electrode is preferably 1 to 1000 (W/(mK)) at 300 K, and is more preferably 5 to 500 (W/(mK)) at 300 K. The thermal conductivity of each low thermal conductive layer is preferably 0.001 to 0.7 (W/(mK)) at 300 K, and is more preferably 0.01 to 0.2 (W/(mK)) at 300 K. The thermal conductivity of each high thermal conductive layer is preferably 0.1 to 1000 (W/(mK)) at 300 K, and is more preferably 0.2 to 500 (W/(mK)) at 300 K.

Third Embodiment

Next, a third embodiment of the present invention will be described with reference to FIG. 5A and FIG. 5B. A cooling device 30 of the present embodiment is different from the above-described second embodiment in that the electric field E (electric field) in the vertical direction in the drawing is applied to the first actuator 3L and the second actuator 3R. Other configurations are the same as those described in the second embodiment. For convenience of explanation, members having the same functions as those illustrated in the drawings of first embodiment are given the same reference numerals, and descriptions thereof will be omitted.

Figure 5A:
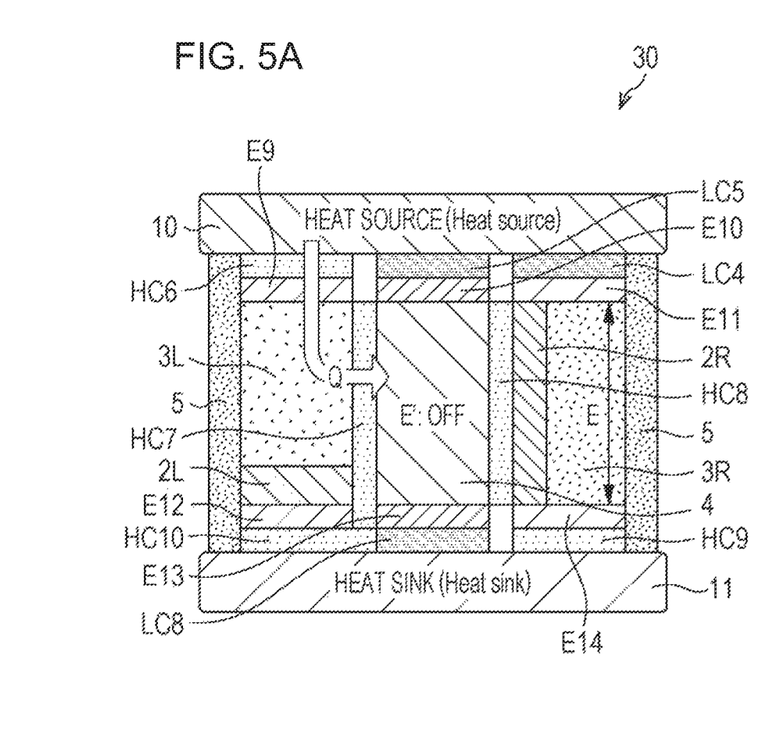
FIG. 5A is a diagram illustrating a case where a cooling device of a third embodiment is in a first period.
Figure 5B:
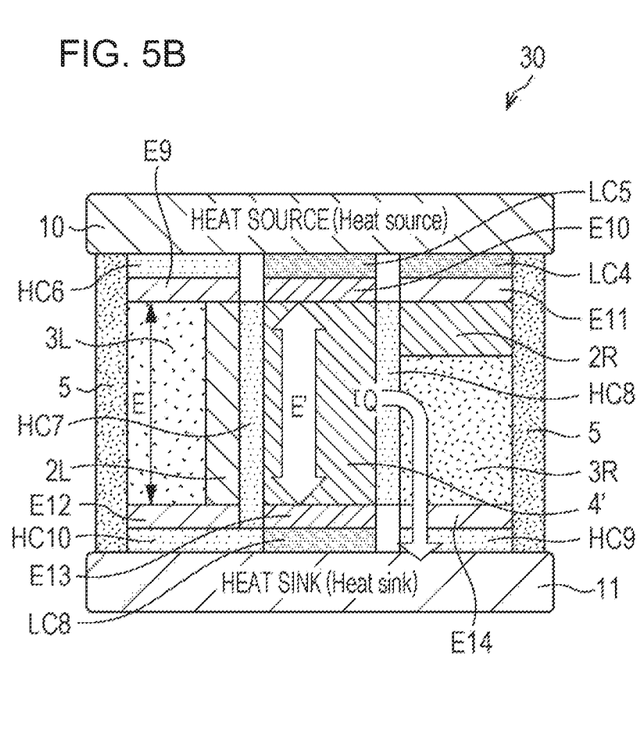
FIG. 5B is a diagram illustrating a case where the cooling device of the third embodiment is in a second period.

FIG. 5A is a diagram illustrating a case where the cooling device 30 of the second embodiment is in a first period, and FIG. 5B is a diagram illustrating a case where the cooling device 30 of the third embodiment is in a second period.

As illustrated in FIG. 5A and FIG. 5B, in the cooling device 30, between the heat source 10 and the heat sink 11, a first thermal switch, an electrocaloric portion, and a second thermal switch are provided in this order in a direction (horizontal direction in a drawing) parallel to a surface of the heat source 10 facing the heat sink 11.

The electrocaloric portion includes an electrocaloric effect material 4 or 4' having exothermic characteristics in an ON state where an electric field E' (voltage) is applied, and endothermic characteristics in an OFF state where the electric field (electric field E': OFF) is not applied, and a plurality of first electrodes E10 and E13 for applying an electric field to the electrocaloric effect material 4 or 4'.

The first thermal switch includes the first low thermal conductive medium 2L, the first actuator 3L having higher thermal conductivity than that of the first low thermal conductive medium 2L, and the second electrode (second upper electrode) E9 and the second electrode (second lower electrode) E12 for applying the electric field E to the first actuator 3L, and in which the heat transfer amount Q from the heat source 10 to the electrocaloric effect material 4 or 4' in the first state is larger than the heat transfer amount Q from the heat source 10 to the electrocaloric effect material 4 or 4' in the second state.

The second thermal switch includes a second low thermal conductive medium 2R, a second actuator 3R having a higher thermal conductivity than that of the second low thermal conductive medium 2R, and the third electrode (third upper electrode) E11 and the third electrode (third lower electrode) E14 which apply the electric field E to the second actuator 3R, and in which a heat transfer amount Q from the electrocaloric effect material 4 or 4' to the heat sink 11 in a third state is larger than a heat transfer amount Q from the electrocaloric effect material 4 or 4' to the heat sink 11 in a fourth state.

Note that, the electrocaloric portion in the cooling device 30 described above is the same as the electrocaloric portion in the cooling device 20 of the second embodiment, and a description thereof will be omitted.

As illustrated in FIG. 5A, during the first period, in the cooling device 30, the electric field E' is not applied to the electrocaloric effect material 4 (electric field E': OFF) so that the electrocaloric portion is turned OFF, the first thermal switch is in the first state, and the second thermal switch is in the fourth state. On the other hand, as illustrated in FIG. 5B, during the second period, in the cooling device 30, the electric field E' is applied to the electrocaloric effect material 4' so that the electrocaloric portion is turned ON, the first thermal switch is in the second state, and the second thermal switch is in the third state.

In the first thermal switch and the second thermal switch of the present embodiment, as the first actuator 3L and the second actuator 3R, a material of which the length in a voltage application direction is increased and the thickness is decreased when a voltage is applied is used, and in a case where the lengths of the first actuator 3L and the second actuator 3R in the voltage application direction are increased and the thicknesses thereof are decreased, the heat transfer amount Q is decreased.

In the present embodiment, the first state of the first thermal switch means an OFF state of the first thermal switch when the electric field E is not applied to the first actuator 3L, and the second state of the first thermal switch means an ON state of the first thermal switch when the electric field E is applied to the first actuator 3L. The heat transfer amount Q from the heat source 10 to the electrocaloric effect material 4 or 4' in the OFF state of the first thermal switch is larger than the heat transfer amount Q from the heat source 10 to the electrocaloric effect material 4 or 4' in the ON state of the first thermal switch. In addition, the third state of the second thermal switch means an OFF state of the second thermal switch when the electric field E is not applied to the second actuator 3R, and the fourth state of the second thermal switch means an ON state of the second thermal switch when the electric field E is applied to the second actuator 3R. The heat transfer amount Q from the electrocaloric effect material 4 or 4' to the heat sink 11 in the OFF state of the first thermal switch rs larger than the heat transfer amount Q from the electrocaloric effect material 4 or 4' to the heat sink 11 in the ON state of the second thermal switch.

Note that, the heat transfer of the cooling device 30 during the first period is the same as the heat transfer of the cooling device 20 during the first period of second embodiment described above, and the heat transfer of the cooling device 30 in the second period is the same as the heat transfer of the cooling device 20 in the second period in the second embodiment described above, and thus the detailed description thereof will be omitted.

As illustrated in FIG. 5A and FIG. 5B, the present embodiment will be described by taking as an example the case where a high thermal conductive layer HC6 having a higher thermal conductivity than that of the first low thermal conductive medium 2L and the second low thermal conductive medium 2R is provided on a surface of the heat source 10 facing the heat sink 11, a high thermal conductive layer HC10 having a higher thermal conductivity than that of the first low thermal conductive medium 2L and the second low thermal conductive medium 2R is provided on a surface of the heat sink 11 facing the heat source 10, a second electrode (second upper electrode) E9 is provided on the surface of a high thermal conductive layer HC6 facing the heat sink 11, and a second electrode (second lower electrode) E12 is provided on the surface of the high thermal conductive layer HC10 facing the heat source 10, but the present invention is not limited thereto, for example, the second electrode (second upper electrode) E9 may be provided on a surface of the heat source 10 facing the heat sink 11, and the second electrode (second lower electrode) E12 may be provided on a surface of the heat sink 11 facing the heat source 10. As illustrated in FIG. 5A and FIG. 5B, the present embodiment will be described by taking as an example the case where a low thermal conductive layer LC4 of which a thermal conductivity is equal to or lower than that of the first actuator 3L and the second actuator 3R is provided on a surface of the heat source 10 facing the heat sink 11, a high thermal conductive layer HC9 having a higher thermal conductivity than that of the first low thermal conductive medium 2L and the second low thermal conductive medium 2R is provided on a surface of the heat sink 11 facing the heat source 10, a third electrode (third upper electrode) E11 is provided on the surface of the low thermal conductive layer LC4 facing the heat sink 11, and a third electrode (third lower electrode) E14 is provided on the surface of the high thermal conductive layer HC9 facing the heat source 10, but the present invention is not limited thereto, for example, the third electrode (third upper electrode) E11 may be provided on a surface of the heat source 10 facing the heat sink 11, and the third electrode (third lower electrode) E14 may he provided on a surface of the heat sink 11 facing the heat source 10.

In the cooling device 30, since the electrocaloric effect material 4 or 4' is not used as an actuator, the volume and shape of the electrocaloric effect material 4 or 4' can be freely designed. Further, the first actuator 3L and the second actuator 3R are changed so as to be expanded and contracted without being bent, and thereby the cooling device 30 with high durability can be realized.

[Appendix]

The present invention is not limited to the embodiments described above, and various modifications are possible within the scope shown in the claims, and embodiments obtained by appropriately combining technical means disclosed in different embodiments are included within the technical scope of the present invention. Furthermore, new technical features can be formed by combining the technical means disclosed in each embodiment.

INDUSTRIAL APPLICABILITY

The present disclosure can be applied to a cooling device and a display device.

What is claimed is:

1. A cooling device comprising:
a heat source;
a heat sink; and
an actuator provided between the heat source and the heat sink,
wherein the actuator includes a first actuator and a second actuator of each of which a thickness and a length vary depending on an applied electric field,
wherein the cooling device further comprises, between the heat source and the heat sink,
an electrocaloric portion that includes an electrocaloric effect material having exothermic characteristics in an ON state where an electric field is applied, and endothermic characteristics in an OFF state where an electric field is not applied, and a plurality of first electrodes for applying an electric field to the electrocaloric effect material;

a first thermal switch that includes a first low thermal conductive medium, the first actuator having a higher thermal conductivity than that of the first low thermal conductive medium, and a plurality of second electrodes for applying an electric field to the first actuator, and in which a heat transfer amount from the heat source to the electrocaloric effect material in a first state is larger than a heat transfer amount from the heat source to the electrocaloric effect material in a second state; and a second thermal switch that includes a second low thermal conductive medium, the second actuator having a higher thermal conductivity than that of the second low thermal conductive medium, and a plurality of third electrodes for applying an electric field to the second actuator, and in which a heat transfer amount from the electrocaloric effect material to the heat sink in a third state is larger than a heat transfer amount from the electrocaloric effect material to the heat sink in a fourth state, wherein in a first period, the electrocaloric portion is in an OFF state, the first thermal switch is in the first state, and the second thermal switch is in the fourth state, and wherein in a second period, the electrocaloric portion is in an ON state, the first thermal switch is the second state, and the second thermal switch is in the third state.

2. The cooling device according to claim 1, wherein the first thermal switch, the electrocaloric portion, and the second thermal switch are provided between the heat source and the heat sink in this order from the heat source side.

3. The cooling device according to claim 2, wherein the plurality of second electrodes are provided on a surface of the heat source facing the electrocaloric portion.

4. The cooling device according to claim 2, wherein a first high thermal conductive layer having a higher thermal conductivity than that of the first low thermal conductive medium and the second low thermal conductive medium is provided on a surface of the heat source facing the electrocaloric portion, and wherein the plurality of second electrodes are provided on a surface of the first high thermal conductive layer facing the electrocaloric portion.

5. The cooling device according to claim 4, wherein a second high thermal conductive layer having a higher thermal conductivity than that of the first low thermal conductive medium and the second low thermal conductive medium is provided on a surface of the heat sink facing the electrocaloric portion, and wherein the plurality of third electrodes are provided on a surface of the second high thermal conductive layer facing the electrocaloric portion.

6. The cooling device according to claim 5, wherein a third high thermal conductive layer having a higher thermal conductivity than that of the first low thermal conductive medium and the second low thermal conductive medium is provided on a surface of the heat source facing the heat sink, and wherein the plurality of second electrodes are provided on a surface of the third high thermal conductive layer facing the heat sink.

7. The cooling device according to claim 6, wherein a fourth high thermal conductive layer having a higher thermal conductivity than that of the first low thermal conductive medium and the second low thermal conductive medium is provided on a surface of the heat sink facing the heat source, and wherein the plurality of third electrodes are provided on a surface of the fourth high thermal conductive layer facing the heat source.

8. The cooling device according to claim 7, wherein the plurality of second electrodes are configured to include a second upper electrode and a second lower electrode, wherein a fifth high thermal conductive layer having a higher thermal conductivity than that of the first low thermal conductive medium and the second low thermal conductive medium is provided on a surface of the heat source facing the heat sink, wherein a sixth high thermal conductive layer having a higher thermal conductivity than that of the first low thermal conductive medium and the second low thermal conductive medium is provided on a surface of the heat sink facing the heat source, wherein the second upper electrode is provided on a surface of the fifth high thermal conductive layer facing the heat sink, and wherein the second lower electrode is provided on a surface of the sixth high thermal conductive layer facing the heat source.

9. The cooling device according to claim 8, wherein the plurality of third electrodes are configured to include a third upper electrode and a third lower electrode, wherein a third low thermal conductive layer having a thermal conductivity equal to or lower than that of the first actuator and the second actuator is provided on a surface of the heat source facing the heat sink, wherein a seventh high thermal conductive layer having a higher thermal conductivity than that of the first low thermal conductive medium and the second low thermal conductive medium is provided on a surface of the heat sink facing the heat source, wherein the third upper electrode is provided on a surface of the third low thermal conductive layer facing the heat sink, and wherein the third lower electrode is provided on a surface of the seventh high thermal conductive layer facing the heat source.

10. The cooling device according to claim 9, wherein an eighth high thermal conductive layer having a higher thermal conductivity than that of the first low thermal conductive medium and the second low thermal conductive medium is provided between the first thermal switch and the heat sink.

11. The cooling device according to claim 9, wherein a fourth low thermal conductive layer having a thermal conductivity equal to or lower than that of the first actuator and the second actuator is provided between the second thermal switch and the heat source.

12. The cooling device according to claim 10, wherein a ninth high thermal conductive layer having a higher thermal conductivity than that of the first low thermal conductive medium and the second low thermal conductive medium is provided between the first actuator in the first thermal switch and the electrocaloric effect material in the electrocaloric portion.

13. The cooling device according to claim 12, wherein a tenth high thermal conductive layer having a higher thermal conductivity than that of the first low thermal conductive medium and the second low thermal conductive medium is provided between the second actuator in the second thermal switch and the electrocaloric effect material in the electrocaloric portion.

14. The cooling device according to claim 2, wherein the plurality of third electrodes are provided on a surface of the heat sink facing the electrocaloric portion.

15. The cooling device according to claim 2, wherein the plurality of first electrodes are configured to include an upper electrode and a lower electrode, wherein the upper electrode is provided on a surface of the electrocaloric effect material facing the heat source, and wherein the lower electrode is provided on a surface of the electrocaloric effect material facing the heat sink.

16. The cooling device according to claim 1, wherein the first thermal switch, the electrocaloric portion, and the second thermal switch are provided between the heat source and the heat sink in this order in a direction parallel to a surface of the heat source facing the heat sink.

17. The cooling device according to claim 16, wherein the plurality of first electrodes are configured to include an upper electrode and a lower electrode, wherein the upper electrode is provided on a surface of the electrocaloric effect material facing the heat source, wherein the lower electrode is provided on a surface of the electrocaloric effect material facing the heat sink, wherein a first low thermal conductive layer having a thermal conductivity equal to or lower than that of the first actuator and the second actuator is provided between a surface of the upper electrode facing the heat source and the heat source, and wherein a second low thermal conductive layer having a thermal conductivity equal to or lower than that of the first actuator and the second actuator is provided between a surface of the lower electrode facing the heat sink and the heat sink.

18. The cooling device according to claim 16, wherein the plurality of second electrodes are provided on a surface of the heat source facing the heat sink.

19. The cooling device according to claim 16, wherein the plurality of third electrodes are provided on a surface of the heat sink facing the heat source.

20. The cooling device according to claim 16, wherein the plurality of second electrodes are configured to include a second upper electrode and a second lower electrode, wherein the second upper electrode is provided on a surface of the heat source facing the heat sink, and wherein the second lower electrode is provided on a surface of the heat sink facing the heat source.

21. The cooling device according to claim 16, wherein the plurality of third electrodes are configured to include a third upper electrode and a third lower electrode, wherein the third upper electrode is provided on a surface of the heat source facing the heat sink, and wherein the third lower electrode is provided on a surface of the heat sink facing the heat source.

22. The cooling device according claims 1, wherein the first actuator and the second actuator are formed of a composite material containing a polymer material and a liquid crystal material.

23. The cooling device according to claim 1,
wherein the electrocaloric effect material contains a liquid crystal material or a composite material containing a polymer material, and a liquid crystal material.

24. The cooling device according to claim 1,
wherein the electrocaloric effect material is a composite material containing a thermal conductive filler.

25. The cooling device according to claim 1,
wherein the first period and the second period are alternately repeated.

26. A display device comprising:
the cooling device according to claim 1; and
a display panel.

* * * * *